(No Model.)
L. SMITH.
Apparatus for Producing Distillers' Mash.
No. 241,887. Patented May 24, 1881.
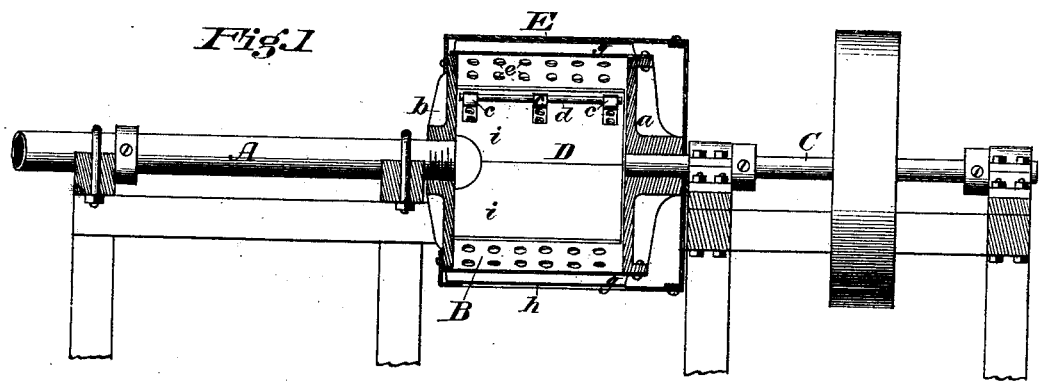
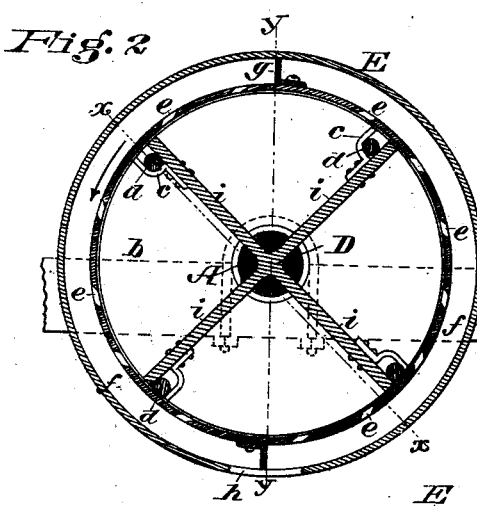
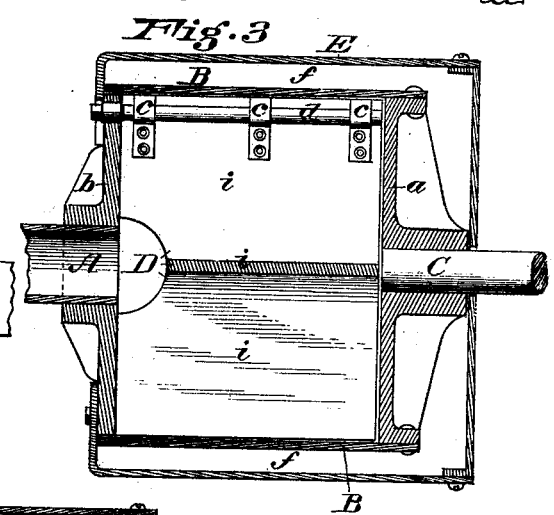
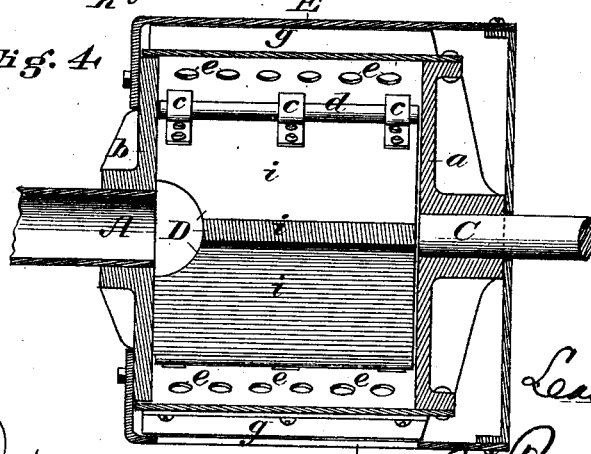
Attest:
W. W. Dodge
Dan'l Kelly
Inventor
Leander Smith
By Rankinson & Rankinson
Attorneys

UNITED STATES PATENT OFFICE.

LEANDER SMITH, OF CINCINNATI, OHIO.

APPARATUS FOR PRODUCING DISTILLERS' MASH.

SPECIFICATION forming part of Letters Patent No. 241,887, dated May 24, 1881.

Application filed February 1, 1881. (No model.)

*To all whom it may concern:*

Be it known that I, LEANDER SMITH, of Cincinnati, in the county of Hamilton and State of Ohio, have invented new and useful Improvements in Apparatus for Producing Distillers' Mash, and for Reducing other Substances in a Moist Condition, of which the following is a specification.

This invention relates to apparatus for reducing substances of a soft or moist nature, and more particularly for treating or reducing steamed or moistened grain for the production of distillers' mash, and is designed as an improvement upon the apparatus for which Letters Patent were granted to Leander Smith and Amor Smith, Jr., bearing date April 22, 1879, and numbered 214,724.

The present invention consists in providing the rotating drum into which the material is fed with perforations, through which said material may escape, and with an internal spider head or frame, the wings of which divide the drum into longitudinal compartments, and serve to hold the material against rotation with the drum, thereby causing the surface of the mass to be continually sheared or sliced off by the edges of the perforations of the rapidly-rotating drum; in forming said perforations with beveled cutting-edges; in providing the wings with loose rollers or bars to keep the perforations open; in surrounding the drum with a casing to receive the material escaping therefrom; in furnishing the drum with external scrapers to remove the material from the casing and discharge it through an opening at the lower side, and in other details.

In the drawings, Figure 1 represents a face elevation of apparatus constructed in accordance with my invention, the portion to which the improvements relate being shown in section; Fig. 2, a transverse vertical section; Fig. 3, a longitudinal section on the line $xx$ of Fig. 2, and Fig. 4 a like section on the line $yy$ of Fig. 2.

The apparatus which I am about to describe is designed for use in connection with a steaming or soaking chamber essentially such as that employed in the patented apparatus above referred to, but may be used independently thereof.

A represents a trunk or pipe leading from the steaming or soaking chamber or other source of supply to the interior of a hollow drum or cylinder, B.

In operation, the material to be treated or reduced is delivered into the drum or cylinder under pressure, and is thereby caused to fill the drum compactly, and to press outward against the walls or interior surface of the drum.

The drum or cylinder is furnished with a head, $a$, and is carried upon the end of a rotating shaft, C, provided with a belt-pulley or gear-wheel, which may receive motion from any convenient source.

Within the drum or cylinder is a spider head or frame, D, consisting of a series of wings, $i$, extending radially from the longitudinal axis of the drum to, or nearly to, the inner wall or face thereof, and from the rotating head $a$ to the fixed head $b$, which latter is secured to the pipe or trunk A, or to the framing, or both, the wings serving to divide the drum or chamber into longitudinal compartments, and to hold the mass against rotation with the drum or cylinder. The spider head or frame is firmly secured to the head $b$, and consequently remains stationary while the drum or cylinder rotates about it, the end of the drum or cylinder overlapping the periphery of the fixed head $b$, as clearly indicated in Figs. 1, 3, and 4.

The drum or cylinder has its body provided with perforations $e$, the edges of which are preferably beveled, as shown in Fig. 2, to form cutting or knife edges. The material being forced through the trunk or pipe A under pressure, enters and fills the interior of the drum, the wings $i$ being cut away where the material enters, as shown, and pressing outward enters the perforations $e$, which, under the rapid rotation of the drum, cut or slice off the material.

It will be seen that as the internal pressure is maintained and the rotation of the drum continues the edges of the perforations are caused to continuously slice or cut off the surface of the mass which is constantly being fed to them.

In order to clear the inner face of the drum and the perforations of skins, husks, or other adhering matter, the wings $i$ are furnished with guides or clips $c$, in which are loosely seated bars or rollers $d$, which, being forced outward by the outwardly-pressed material, bear with a yielding force against the inner face of the drum or cylinder, thus removing adhering particles.

As the substance operated upon is sliced or cut it passes through the perforations e and is delivered into an annular chamber, f, formed by a surrounding casing, E, secured to the fixed head b, or the framing of the apparatus. In order to collect the material thus acted upon or reduced the drum or cylinder B is furnished with scrapers g, traveling close to the inner face of the casing, as shown in Figs. 2 and 4, and serving to move said material to a discharge-opening, h, at the lower side of the casing, through which it falls into a receptacle provided to receive it.

The apparatus may be constructed of any suitable materials and may be modified somewhat as to details and operation—as, for instance, by providing the trunk or pipe with a pulley or driving-gear and causing the spider head or frame to rotate in an opposite direction to that in which the drum or cylinder travels, or in the same direction, but at a different rate of speed, or by arranging the spider-head to rotate and the drum or cylinder to remain stationary.

Instead of being formed solid, as represented in the drawings, the wings i may be of skeleton form, and simply a bar employed at the outer extremity of each. It will also be seen that good results may be obtained with perforations having upright edges instead of inclined or beveled faces, though the construction shown is deemed preferable.

Having thus described my invention, what I claim is—

1. The herein-described reducing apparatus consisting of a perforated hollow revolving drum and a relatively stationary internal spider frame or head, to hold the material against rotation while being sliced or cut by the edges of the perforations.

2. In an apparatus for reducing grain and other substances, a perforated hollow revolving drum or cylinder and a relatively stationary internal spider frame or head dividing the drum into longitudinal compartments, as described and shown.

3. In an apparatus for reducing grain and other substances, the combination of a perforated revolving drum or cylinder to receive the material to be treated, a relatively stationary internal head or spider, and means, substantially such as described and shown, for clearing the perforations in the drum.

4. In a reducing apparatus for grain and other substances, a hollow drum adapted to contain the material to be treated, provided with perforations having beveled cutting-edges, substantially as and for the purpose set forth.

5. An apparatus for reducing grain and other substances, consisting of a perforated hollow revolving drum or cylinder, an internal head adapted to hold the material against rotation with the drum, an outer casing to receive the material acted upon, and a trunk or pipe for supplying material to the interior of the drum or cylinder.

6. The apparatus herein described for reducing grain and other substances, consisting of the rotating hollow perforated drum B, pipe A, head or spider D, provided with movable rolls d, casing E, and scrapers g.

7. In combination with the casing E, having a discharge-opening, the rotating hollow drum B, provided with scrapers g, as shown.

8. The herein-described method of reducing grain and other substances, consisting in introducing the same under pressure into a hollow perforated revolving drum provided with internal wings to hold the material against rotation with the drum.

LEANDER SMITH.

Witnesses:
WILLIAM W. DODGE,
GEORGE BAUER.